United States Patent [19]

Takahashi

[11] 4,427,909
[45] Jan. 24, 1984

[54] PLACING STAND DRIVING DEVICE HAVING FLYWHEEL EFFECT IN ONLY ONE DIRECTION

[75] Inventor: Toshikatsu Takahashi, Kanagawa, Japan

[73] Assignee: Fuji Xerox Co., Ltd., Tokyo, Japan

[21] Appl. No.: 361,027

[22] Filed: Mar. 23, 1982

[30] Foreign Application Priority Data

Mar. 24, 1981 [JP] Japan .................. 56-42745

[51] Int. Cl.³ .............. H02K 7/02; G03G 15/28
[52] U.S. Cl. ............................. 310/74; 310/78; 355/8; 355/50
[58] Field of Search .............. 310/49, 74, 76, 92, 310/100, 66, 78; 192/43, 43.1; 74/572, 574; 358/293, 285; 355/8, 50, 51, 75, 11, 56

[56] References Cited

U.S. PATENT DOCUMENTS

| 3,422,700 | 1/1969 | Wittwer | 74/574 |
| 3,554,640 | 1/1971 | Hoskins | 355/8 |
| 4,148,578 | 4/1979 | Bujese | 355/8 |
| 4,149,196 | 4/1979 | Wada et al. | 358/286 |
| 4,171,901 | 10/1979 | Takizawa | 355/8 |

Primary Examiner—J. D. Miller
Assistant Examiner—D. Rebsch
Attorney, Agent, or Firm—Sughrue, Mion, Zinn, Macpeak & Seas

[57] ABSTRACT

A placing stand for use with a microfilm copying device or the like is driven by means of a step motor connected to the stand by wires or the like. A flywheel is coupled to the shaft of the step motor via a one way clutch so as to damp vibrations of the step motor, while allowing the stand to be quickly returned; the flywheel is not a load on the motor in the return direction.

8 Claims, 3 Drawing Figures

PLACING STAND DRIVING DEVICE HAVING FLYWHEEL EFFECT IN ONLY ONE DIRECTION

BACKGROUND OF THE INVENTION

This invention relates to a device for driving a placing stand on which an aperture card is placed.

In a placing stand driving device driven by a step motor, a vibration inherent in the step motor is caused when the step operation of the step motor is suspended. The vibration is transmitted to the placing stand, to cause the latter to vibrate slightly back and forth. As a result, the resolution is decreased or the resultant image is staggered; that is, the resultant copy is of low quality.

In order to overcome the above-described difficulties, a variety of methods have been proposed in the art. In one of these methods, a spring is employed to push a flywheel against the shaft of a step motor, so that the frictional contact between the motor shaft and the flywheel applies a load to the motor. In another method, oil is provided between a flywheel mounted through a bearing on the motor shaft and an external shell member secured to the motor in a manner such as to cover the flywheel, to apply a load to the motor. In another method, the flywheel is made of a permanent magnet, so that the magnetic flux formed between the permanent magnet and the motor shaft loads the motor. In each of these conventional methods, a flywheel effect is utilized to apply a load to the motor so that the step operation is made smooth at the start and end points.

In all of the conventional methods of damping the inherent vibration of a step motor, the load of the motor is increased so that the inherent vibration of the motor may be eliminated when the original is scanned. However, the conventional methods are disadvantageous in that the placing stand cannot be quickly returned to its original position because of the increased load.

SUMMARY OF THE INVENTION

Accordingly, an object of this invention is to provide a placing stand driving device which, when an original is scanned, utilizes a flywheel effect to reduce the inherent vibration of the step motor, and when the placing stand returns to its original position, eliminates the flywheel effect to reduce the load on the motor to thereby allow the placing stand to return quickly.

DETAILED DESCRIPTION OF THE PREFERRED EMBODIMENTS

Figure 1:
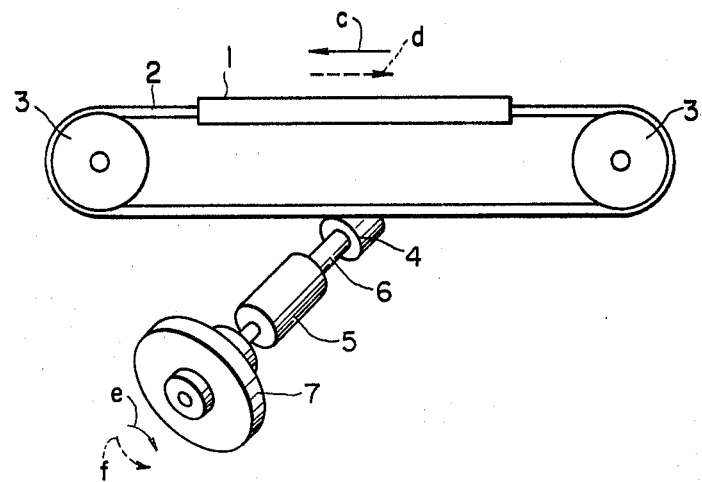
FIG. 1 is an explanatory diagram illustrating a placing stand driving device according to the invention.

FIG. 1 schematically illustrates one embodiment of the invention. Both ends of a wire 2 are connected respectively to both ends of a stand 1 on which an aperture card is placed. The wire 2 is laid over pulleys 3 which are suitably spaced apart from one another, and is coupled to a drive pulley 4 which is connected to the rotary shaft of a step motor 5. The drive pulley 4 is turned by operation of the step motor 5, so that the stand 1 is moved horizontally in FIG. 1. The portion of the stand 1 on which an aperture card is placed is transparent, and an illuminating lamp and a photo-sensitive material (not shown) are respectively provided on either side of the stand. As the aperture card on the placing stand is illuminated by the lamp, the image of a picture recorded on the film of the aperture card is formed on the photo-sensitive material through a suitable optical system (not shown) such as a lens, and is then developed by a conventional developing method. The film surface of the aperture card on the stand is scanned line by line by reciprocating the stand 1 using the step motor 5.

Figure 2:
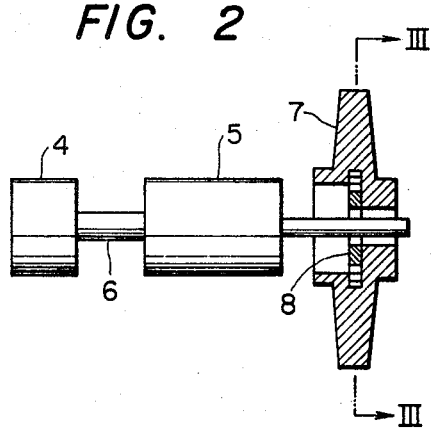
FIG. 2 is a longitudinal sectional view of the drive section of the device shown in FIG. 1.
Figure 3:
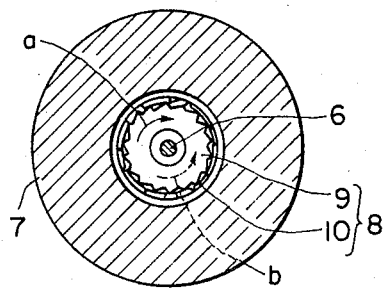
FIG. 3 is a sectional view taken along the line III—III of FIG. 2.

In order to damp the inherent vibration of the step motor 5, a flywheel 7 is connected to the side of the step motor 5 opposite to the load side of the step motor, i.e., the drive pulley side, to impart a flywheel effect to the step motor 5. As shown in FIG. 2, one-way clutch 8 is provided between the flywheel 7 and the step motor 5, to control the coupling relation between the flywheel 7 and the motor 5. The one-way clutch 8 is made up of a ratchet wheel 9 and gravity pawls 10. The ratchet wheel 9 is fixedly secured to the motor shaft 6, while the gravity pawls 10 are provided interiorly of the flywheel. When the ratchet wheel is turned in the direction of the arrow a, it engages the pawls 10, so that the rotation of the motor shaft 6 is transmitted to the flywheel. When the ratchet wheel 9 is turned in the direction of the arrow b, the pawls 10 are pushed into the flywheel 7, and accordingly the ratchet wheel 9 is not engaged with the pawls 9 and therefore the rotation of the motor shaft 6 is not transmitted to the flywheel 7.

The placing stand driving device thus constructed according to the invention operates as follows:

In the case where an original, namely, an aperture card is scanned, the drive pulley 4 is turned in the direction of the solid line arrow e by the step motor 5, so that the placing stand 1 is moved in the direction of the arrow c. In this operation, the ratchet wheel 9 of the one-way clutch 8 is turned in the direction of the arrow a, and is therefore engaged with the gravity pawls 10, to turn the flywheel in the direction of the arrow e. Therefore, a flywheel effect is given to the step motor 5, to damp the inherent vibration thereof, as a result of which the placing stand 1 carries out a smooth step operation.

On the other hand, in the case where the stand 1 is returned to its original position, the step motor 5 is turned in the direction of the broken line arrow f, to move the stand 1 in the direction of the arrow d. In this operation, the ratchet wheel 9 of the one-way clutch 8 is turned in the direction of the arrow b, and therefore the ratchet wheel 9 is not engaged with the gravity pawls 10 and the flywheel 7 is accordingly not turned. Accordingly, the load of the step motor 5 is reduced, so that the motor may be turned at high speed, to quickly return the placing stand.

As is apparent from the above description, according to the invention, the flywheel is coupled through a one-way clutch to the shaft of the step motor, which is on the side opposite the load side, so that, when the step motor turns in one direction, the clutch is engaged with the flywheel to cause the latter to turn with the motor shaft to thereby damp the vibration of the motor; while when the motor turns in the opposite direction, the rotation of the motor shaft is not transmitted to the flywheel through the clutch, i.e. the flywheel is disconnected from the motor by the clutch, as a result of which the load on the motor is decreased to allow the step motor to turn at high speed.

While the invention has been described with reference to one preferred embodiment, it should be noted that the invention is not limited thereto or thereby. For example, instead of the one-way clutch described above, other means utilizing the engagement of a ratchet wheel and rollers may be employed.

What is claimed is:

1. A placing stand driving device comprising:
   a step motor having an output shaft;
   torque transmitting means for translating rotary movement of said output shaft in both clockwise and counterclockwise directions to linear movement of said placing stand in respective opposed directions;
   a flywheel; and
   directional coupling means for coupling said flywheel to said output shaft for and only for rotary movement of said output shaft in a predetermined one of said clockwise and counterclockwise directions.

2. A driving device as claimed in claim 1, wherein said flywheel is arranged on a side of said step motor opposite said torque transmitting means.

3. A driving device as claimed in claim 1, wherein said torque transmitting means comprises wire means, said flywheel being mounted on said shaft on a side of said step motor opposite said wire means.

4. A driving device as claimed in claim 1, wherein said directional coupling means comprises one-way clutch means.

5. A driving device as claimed in claim 4, said clutch means comprising ratchet means rotatable with an output shaft of said step motor, and pawl means mounted on said flywheel.

6. A driving device as claimed in claim 5, said pawl means comprising a plurality of gravity pawls, said ratchet means transmitting torque to said pawls only when said ratchet is rotated in a direction corresponding to moving said stand to scan said original.

7. A driving device as claimed in claim 6, wherein, when said ratchet is rotated in the other direction, said pawls are not engaged with said ratchet, whereby said flywheel constitutes no load on said motor.

8. A placing stand driving device as claimed in claim 1, wherein said predetermined one of said clockwise and counterclockwise directions corresponds to linear movement of said placing stand in a scanning direction.

* * * * *